United States Patent

[11] 3,563,204

| [72] | Inventor | Bela A. Szilagyi |
| | | Flushing, N.Y. |
| [21] | Appl. No. | 824,982 |
| [22] | Filed | May 15, 1969 |
| [45] | Patented | Feb. 16, 1971 |
| [73] | Assignee | Belmotronics, Inc. |
| | | Long Island, N.Y. |
| | | a corporation of Delaware |

[54] ILLUMINATED ACQUARIUM
9 Claims, 2 Drawing Figs.

[52] U.S. Cl. ................................................. 119/5, 40/106
[51] Int. Cl. ........................................... A01k 63/00
[50] Field of Search ................................. 119/5, 3; 40/106, 52, 130 (K)

[56] References Cited
UNITED STATES PATENTS

| 1,871,742 | 8/1932 | Sabath ........................ | 119/5 |
| 1,965,323 | 7/1934 | Taslitt ......................... | 119/5X |
| 2,002,380 | 5/1935 | Wernicke et al. ............ | 119/5X |
| 2,888,205 | 5/1959 | Trucco ........................ | 119/5X |

Primary Examiner—Hugh R. Chamblee
Attorney—Irving Seidman

ABSTRACT: This disclosure is directed to an illuminated aquarium comprising a base for containing a hidden light source in combination with an aquarium having a translucent or light pervious bottom supported on the base. Secured to the light pervious bottom of the aquarium are optic or light transmitting means capable of internal reflection, shaped to simulate and/or to define an underwater object or theme which is indirectly illuminated by light of the hidden light source.

Patented Feb. 16, 1971

3,563,204

INVENTOR.
BELA A. SZILAGYI
BY
*Irving Seidman*
ATTORNEY 3,563,204

ILLUMINATED ACQUARIUM

PROBLEM IN THE ART

In aquariums, and particularly aquariums adapted to contain tropical fish, it was necessary to maintain the water temperature at a predetermined level to insure the proper environment for the tropical fish. Generally, such aquariums were heated by means of electric submersible heaters placed directly into the water of the aquariums and/or by means of an electric light bulb placed over the top of the tank. In either event a cover was frequently required to be placed over the top of the tank to retain the heat therein. Also such heating efforts generally detracted from the esthetic appearance of the aquarium which are generally displayed for esthetic purposes.

Owners of aquariums also frequently sought to enhance the esthetic appearance by decorating the aquarium with underwater figures to simulate various underwater scenes. These efforts consisted merely of simply placing objects constructed in the form of statuary and/or plant life into the aquarium tank and as such were incapable of any illumination. Aquariums so decorated offered only minimum interest or appeal in day light and absolutely none in a darkened room.

OBJECTS

An object of this invention is to provide an illuminated aquarium in which the source of illumination is hidden and used to indirectly maintain the temperature of the water and to illuminate objects submerged in the water to define illuminated underwater scenes added interest and esthetics.

Another object is to provide an aquarium having a hidden light source disposed completely exteriorly of the water contained therein, and having optic means disposed within the water in light transmitting relationship to the hidden light source so that the water submerged optics are indirectly illuminated thereby.

Another object is to provide an aquarium having hidden light source disposed completely exteriorly of the water contained therein, and having optic means disposed within the water in light transmitting relationship to the hidden light source so that the water submerged optics are indirectly illuminated thereby.

Another object is to provide an illuminated aquarium whereby the color of the lighting and/or reflected light can be varied for added esthetic appeal.

Another object is to provide an aquarium having an overall pleasing illuminated and visual novelty effect.

BRIEF SUMMARY OF THE INVENTION

The foregoing objects and other features and advantages are attained by an aquarium comprising a base in which a concealed light source is located. Supported on the base is an aquarium tank formed with a translucent or light pervious bottom wall in light transmitting relationship to the hidden light source within the base. Within the tank and arranged to be completely surrounded by the water are light reflecting optic means shaped to simulate various underwater objects and/or plant or animal life. The optic means comprises a light reflecting member capable of bending light rays so that the reflected light is emitted out through the ends of the member.

For added esthetic appeal a means is located between the light source and the bottom of the aquarium for varying the light color transmitted to the optics. The color varying means comprises a rotating disc having multicolored segments which can be suitably driven to serially pass the multicolored portions between the light source and the optic means reflecting the light therefrom.

FEATURES

A feature of this invention resides in an illuminated aquarium which is relatively inexpensive to fabricate and which is positive in operation.

Another feature of this invention resides in the provision of an illuminated aquarium having simulated underwater objects which are indirectly illuminated thereby providing an absolutely safe illuminated aquarium for added esthetic appeal.

Another feature of this invention resides in the provision of an aquarium in which the water can be readily heated to a predetermined temperature without visible heaters.

Other features and advantages will become more readily apparent when considered in view of the drawing and specification in which.

Figure 1:
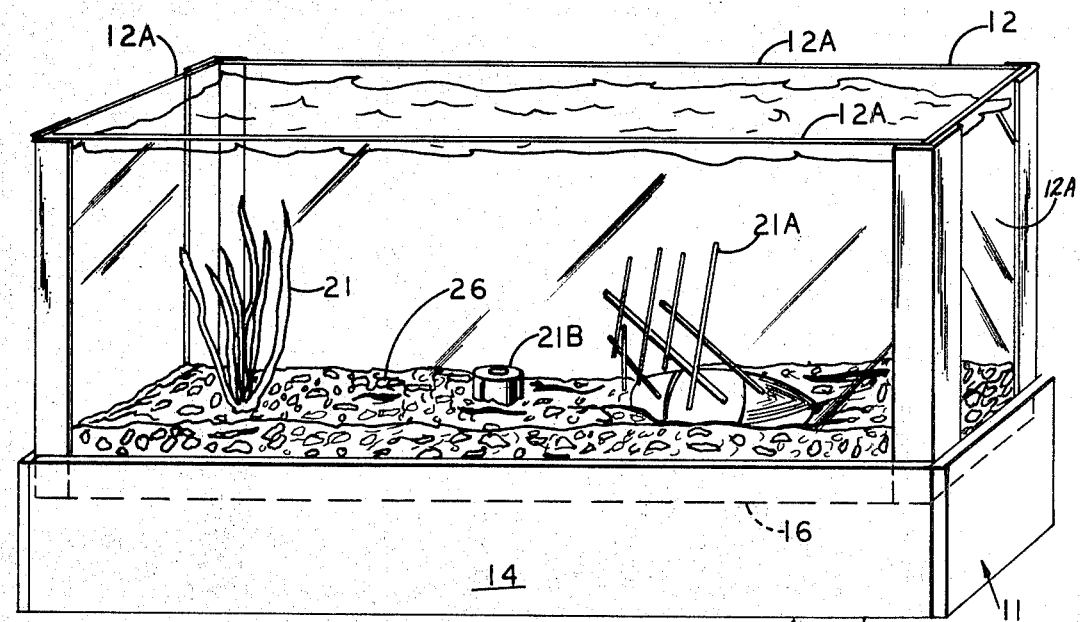
FIG. 1 is a perspective view of an aquarium embodying the present invention.
Figure 2:
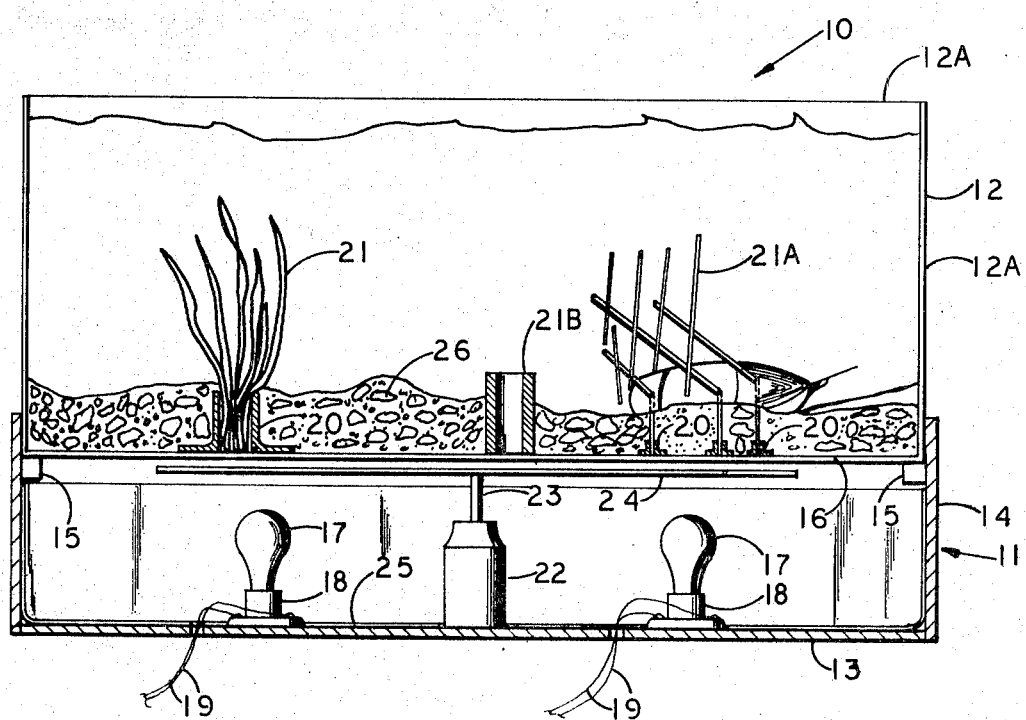
FIG. 2 is a sectional view taken along line 2—2 on FIG. 1.

Referring to the drawings there is shown in FIGS. 1 and 2 an illuminated aquarium 10 comprising a base housing 11 and the aquarium tank 12 for containing a quantity of water for supporting the fish or marine animal and/or or plant life. In the illustrated form of the invention the base housing 11 comprises a bottom wall 13 to which there is connected a circumscribing end wall 14 to define a full open top base housing 11. A circumscribing flange or ledge 15 may be located on the internal surface of the circumscribing wall 14 to provide a support for the aquarium tank 12. As best seen in FIG. 2 the bottom 16 of the aquarium tank 12 is spaced above the bottom wall 13 of the base housing 11.

Mounted within the base housing 11 are one or more sources of illumination. In the illustrated form of the invention the source of illumination comprises one or more electric light bulbs 17 suitably retained in a light socket 18 connected to the housing bottom wall 13. It will be understood that the respective light bulbs 17 are connected to any suitable source of electrical power, as for example, a generator, battery and/or ordinary line current by suitable electrical conductors 19.

The aquarium container or tank 12 is defined by a plurality of circumscribing end walls 12A connected to a bottom container wall 16. The container bottom wall 16 is formed of a translucent, transparent or light pervious material, as for example, glass, plastic and the like, the bottom wall 16 of the container 12 being disposed in light transmitting relationship to the electric light sources 17 located in the base housing 11. The upstanding circumscribing walls 12A of the tank or portions thereof may be formed of any transparent material so that the plant and/or animal life contained within the aquarium can be rendered readily visible to the viewer.

Connected to the bottom 16 of the aquarium tank 12 are one or more holders 20 for maintaining in position on the bottom wall 16 variously shaped optic means 21, 21A and 21B. Preferably the optics 21, 21A and 21B are shaped to simulate various undersea objects and/or plant or animal life. For example, as shown in FIGS. 1 and 2, the optic means 21 may be shaped to define underwater plant life, as for example, sea weed. Or the optic means may be shaped to define the mass structure of a sunken ship as indicated at 21A. Alternately, the optics 21, may be shaped to simulate any desired configuration, as for example, a tube or cylinder as indicated at 21B. Consequently it is contemplated that the optics may take any underwater form commonly associated for undersea activity and/or theme, and it will be understood that the specific form and/or simulation of the undersea objects is not critical to an understanding of this invention.

The optic means 21 comprises an optic fiber or shape formed of a light transmitting member in which the phenomenon of total internal reflection occurs. Because of this phenomenon light rays are bent by the light transmitting member so that the light reflected into one end is transmitted therethrough and emitted out of the opposite end thereof. Because of this phenomena various appealing and esthetic illuminated visual effects can be achieved. Another consideration is that the optic means 21 are indirectly illuminated and therefore the need for directly wiring the submerged objects to a source of electrical energy is completely eliminated, as are also the hazards and/or difficulty in effecting the necessary insulation and/or water proofing of such electrical connections. By effecting such indirect illumination of submerged objects safety is increased with added esthetic appeal.

To further enhance the esthetic appeal a means is disposed within the base housing 11 for varying the color of light transmitted to the light transmitting members 21, 21A, 21B. In the illustrated form of the invention and referring particularly to FIG. 2, there is mounted on the bottom 13 an electric motor 22 which has connected to the armature 23 thereof a colored wheel 24 having various segmented color portions. The motor 22 is suitably connected to a source of electric current so that when energized, the armature 23 will effect the rotation of the colored wheel 24. The diameter of the colored wheel is such that the color portions are disposed between the hidden light source 17 and the optic transmitting members 21. It will be understood that as the colored portions of the wheel 24 rotate or intercede between the light source 17 and the reflecting members 21, 21A, 21B, that the color of the light will vary accordingly, and that color would be transmitted through the optic means 21, 21A, 21B. With the subject matter described it will become readily apparent that the visual effects resulting from the applicant's disclosure will transmit to the tank and water surrounding the objects 21, 21A, 21B an illuminous and iridescent type of light which greatly enhances the appeal and esthetics of the aquarium, enhancing interest in the room in which the aquarium is placed, particularly when the room is darkened.

By controlling the wattage of the respective light bulbs 17, it is also possible to utilize the heat generated to maintain the temperature of the water within the tank to a proper level by indirect transmission of the heat. To effect a more efficient transfer from the light source 17 to the water, the inner surfaces of the base housing 11 may be lined with a reflecting surface 25, as for example, a sheet of metallic foil, mirrors, glass, or the like. Consequently depending upon the wattage output of a particular bulb 17, the amount of heat transmitted to the water can be calculated, and that by proper proportioning of wattage and/or the number of bulbs, the proper amount of heating can be provided.

As shown in FIGS. 1 and 2 the holding means 20 connected to the bottom of the tank 12 for holding the optics 21 can be readily concealed by placing a bed of gravel 26 in the container. Consequently the gravel bed 26 in the container 12 will form an opaque bottom for the container so that the only light transmitted through the bottom 16 of the container is that light which is reflected through the ends of the optics 21 in contact or adjacent the light pervious bottom wall 16. The arrangement thus described results in achieving an unusual and eerie luminescence which greatly enhances the appeal and esthetics of the aquarium With the construction described the hidden light source therefore not only functions to maintain the water temperature of the aquarium at a predetermined level but also constitutes a means for indirectly illuminating the optic members 21, 21A, 21B submerged in the water for added appeal and charm.

It is further contemplated that the esthetic appeal produced by the colored wheel 24 as illustrated in the embodiment of FIG. 2 can be alternatively achieved by utilizing a plurality of differently colored blinking bulbs arranged in a circuit whereby the respectively different colored bulbs can be energized independently of one another for a predetermined period of time. The light thus given off by the energizing of the respectively colored bulbs is then transmitted to the light transmitting members 21, 21A or 21B in the manner hereinbefore described.

While the instant invention has been described with respect to a particular embodiment thereof it will be readily understood and appreciated that variations and modifications may be made without departing from the spirit or scope of the invention.

I claim:
1. An aquarium comprising:
   a base housing having a bottom wall and connected upright circumscribing end walls,
   a container supported on said base housing, said container being adapted to contain a quantity of water for supporting marine life,
   said container having a light pervious bottom and at least one transparent sidewall,
   said container bottom being supported in space relationship with respect to the bottom wall of said base housing,
   a source of illumination disposed in the space between said container bottom and the bottom wall of said base housing, and
   optic means adapted to be surrounded by the water in the container simulating undersea objects connected to the bottom of said container,
   said optic means comprising a light transmitting member adapted to bend rays of light whereby the light of said source of illumination is transmitted to said optic means surrounded by the water.
2. The invention as defined in claim 1 and including means for changing the color of the light transmitted to said light transmitting member.
3. The invention as defined in claim 2 wherein said color changing means includes a color wheel rotatably mounted in said space, said color wheel being disposed between said means for rotating said wheel.
4. The invention as defined in claim 3 wherein said color wheel includes a plurality of various color segments.
5. The invention as defined in claim 1 and including a liner of reflecting material covering said bottom wall of the base housing.
6. The invention as defined in claim 1 wherein said means simulating said undersea objects comprising bundles of optic fibers shaped to simulate undersea plant life.
7. An aquarium comprising:
   a base having a bottom wall and circumscribing upwardly extending end walls to define an open top base housing,
   a liner of reflecting material covering the bottom wall and circumscribing end walls,
   a light source located in said base housing,
   said light source including an electric light,
   a container adapted to contain a quantity of water for supporting marine life,
   said container having a light impervious bottom wall, and connected upwardly extending transparent end walls,
   means for supporting said container adjacent the upper end of said base housing whereby the bottom of said container is spaced above said light source,
   means adapted to be surrounded by the water in the container connected to the bottom wall of the container, said latter means simulating underwater objects,
   said underwater simulating means comprising a light transmitting member in which the phenomenon of total internal reflection occurs whereby the light from said light source is reflected through to the ends of said simulating means to provide said aquarium with various illuminated visual effects.
8. The invention as defined in claim 7 and including means for changing the color of the light transmitted to said light transmitting member.
9. The invention as defined in claim 2 wherein said color changing means comprises a pigmentated color glass for the source of light.